June 24, 1958 — R. M. MINTON — 2,840,330
FISHING ROD HOLDER
Filed March 1, 1954

INVENTOR
Robert M. Minton

BY Mason, Fenwick & Lawrence
ATTORNEYS

United States Patent Office 2,840,330
Patented June 24, 1958

2,840,330

FISHING ROD HOLDER

Robert M. Minton, Midland, Tex., assignor of one-half to Art H. Hamner, San Angelo, Tex.

Application March 1, 1954, Serial No. 413,406

3 Claims. (Cl. 248—41)

This invention relates to a fishing rod holder, and it has for its principal object the provision of a rod holder particularly useful in trolling, which may be conveniently and quickly clamped to the gunwale of a boat or removed therefrom; which provides a range of angular adjustment of the rod both in vertical and horizontal directions, and which comprise freely coupled sections that can be separated by the mere act of lifting the rod so that immediately a fish strikes, the rod may be released from the restraint of the holder and manipulated without any impediment to the exercise of his best skill by the fisherman.

Other objects of the invention will appear as the following description of a preferred and practical embodiment thereof proceeds.

In the drawing through the figures of which the same characters of reference have been used to denote identical parts:

Figure 1:
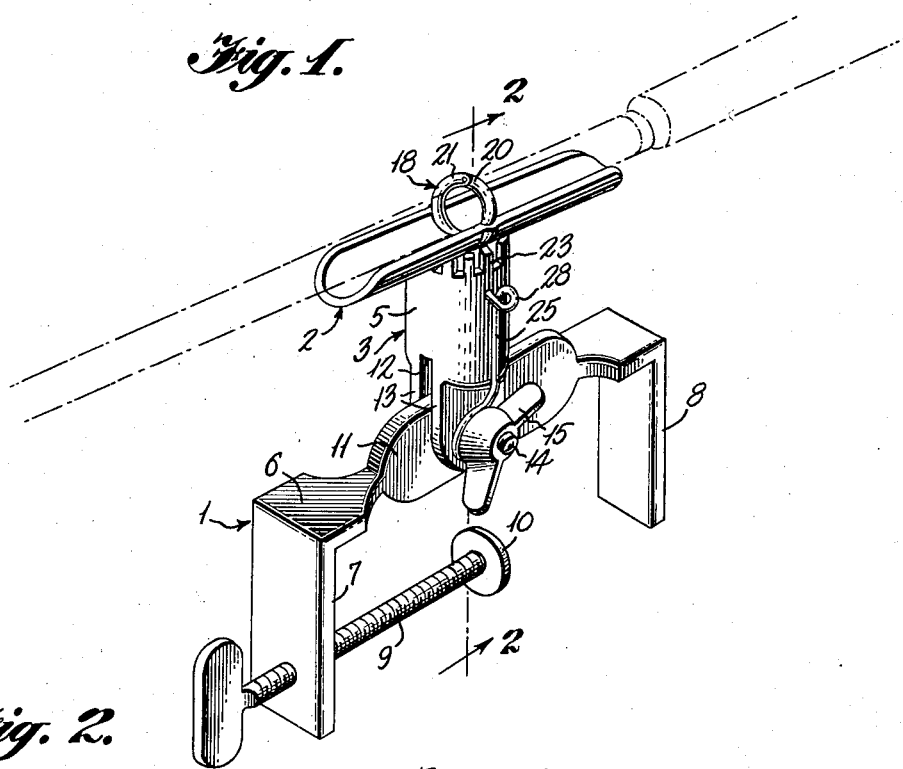
Figure 1 is a perspective view of a fishing rod holder embodying the principles of the invention.

Referring now generally to the drawing, the rod holder essentially comprises a clamp 1 for fixing the holder to a support, a cradle 2 removably attachable to the fishing rod, and a coupling 3 between the clamp and cradle consisting of telescoped male and female coupling elements 4 and 5, the former being rigid with the cradle, and therefore, ordinarily carried with the cradle by the rod, the female member being pivotally connected to the clamp for angular adjustment of the rod in a vertical plane, the coupling elements being relatively rotatable and together providing angular adjustment of the rod in azimuthal direction.

Proceeding to a detailed description of the invention, the clamp 1 has the general form and function of a C clamp, comprising an integral frame having a transverse portion 6 and parallel end portions 7 and 8. A clamp screw 9 is threaded in the end portion 7, having a swivel head 10 which cooperates with the end portion 8 to secure the clamp over the gunwale of a boat or any other suitable support. The intermediate part 11 of the transverse portion 6 is disposed with its thickness dimension in a vertical plane, the more conveniently to cooperate with the male coupling element 5.

The latter comprises a cylindrical socket having a deep slot 12 extending inwardly from its lower end of such width as to closely embrace the intermediate part 11 of the clamp frame. The slot defines opposite bifurcations 13, which are of sufficient thinness to possess a degree of inherent resiliency. The bifurcations 13 embrace the intermediate part 11 and registering apertures extend through said intermediate part and bifurcations, receiving a bolt 14, with a single nut 15 on its end, by means of which, clamping pressure is imparted through said bifurcations to said intermediate part 11. The latter is formed with a circular series of elevations 16, while the inner faces of the bifurcations 13 are formed with corresponding circular series of depressions 17. These depressions and elevations selectively interfit and hold the coupling member 5 in any angular position with respect to the clamp. The slot 12 is of sufficient depth to provide an extensive range of adjustment of the rod in a vertical plane. The end walls of the slot abut the clamp, thus forming a limit stop defining the ends of the range of swing of the coupling member 5.

Figure 2:
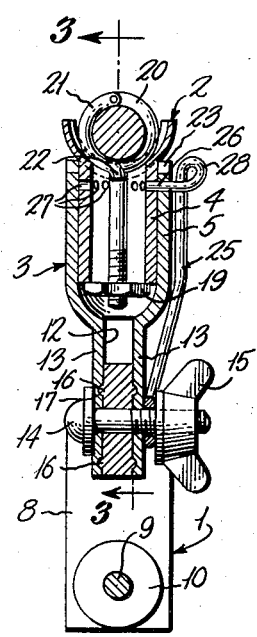
Figure 2 is an axial section taken along the line 2—2 of Figure 1.
Figure 3:
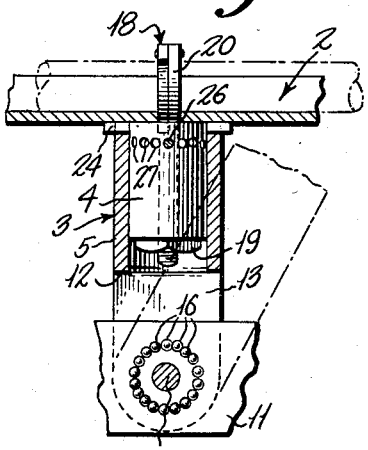
Figure 3 is a fragmentary sectional view taken along the line 3—3 of Figure 2.

The cradle 2 is a trough shaped member of cylindrical cross-section on the inside, adapted to receive the fishing rod, as indicated in Figure 1. Said cradle is integral with the male coupling element 4 which is a cylindrical tube, and fits rotatably within the female coupling member 5, as shown in Figure 2. The fishing rod is secured within the cradle by means of an eye bolt 18, the stem of which passes axially through the male coupling member 4 and has a nut 19 screwed upon its inner end and abutting the lower end of the coupling member 4, so that the eye bolt draws the rod down tight in clamped relation to the cradle 2. In order that the rod shall lie flush against the inner surface of the cradle 2, the latter is formed intermediately with a transverse channel, into which the eye of the eye bolt 18 sinks until the inner circumference of the eye coincides with the inner circumference of the cradle. The eye of the eye bolt is divided, comprising a section 20 integral with the stem of the eye bolt, and which is preferably somewhat greater than 180° in arcuate extent, so that it overlies the fishing rod in the medial vertical axial plane of the latter. The other section of the eye is a keeper 21, pivoted to the section 20, and having a downbent terminal portion 22 which fits in an elongated hole in the cradle 2, being insertable therein before the eye bolt is drawn tight.

It will be readily understood from the above description of the cradle 2, coupling member 4 and eye bolt 18 that these members are normally secured tightly to the fishing rod so as to remain therewith when the rod is lifted from the holder. Consequently, that is to say, when desired, the cradle may be removed from the rod by loosening the nut 19 so as to free the keeper 21.

The female coupling member is castellated at its upper end, as indicated at 23, and the under side of the cradle is provided with the teeth of square cross-section 24 at diametrically opposite points, which can be selectively fitted in any pair of diametrically opposed spaces between the teeth on the castellated end of the coupling element. By this means, the rod can be selectively adjusted in any of a number of positions in a horizontal or azimuthal direction.

In order to prevent inadvertent displacement and possible loss of the fishing rod, it is preferred to have some quick detachable latching means to hold the coupling members together. Such a means comprises the latch 25, which consists of a bent resilient rod having an eye that fits upon the bolt 14 beneath the wingnut 15, and having its other end 26 directed radially inward through an aperture in the coupling member 5 and adapted to be brought into registry with a circumferential series of holes 27 and to enter one of these holes for maintaining the coupling member 4 latched against axial displacement. The rod 25 has a convolution 28 adjacent its upper end, adapted to be contacted by the thumb for quickly releasing the latch.

The operation of the fishing rod holder will be obvious from the above description. After the clamp has been fixed to the boat, the rod can be given any adjusted position, both in a horizontal plane and in a vertical plane. When a fish has struck, the fisherman quickly presses the thumb against the convolution 28 and lifts the rod with the cradle, eye bolt and coupling member 4 fastened thereto, from the female coupling member 5, which remains clamped to the boat. The rod is then free for any manipulation essential to hook and land the fish. At the end of the fishing, the rod may be removed from the cradle in the manner described, the vacant eye bolt tightened up with respect to the cradle and coupling member 4, the latter replaced within the socket of the coupling member 5, and secured by the latch 25. The entire rod holder is thus kept together ready for a subsequent fishing.

While I have in the above description disclosed what I believe to be a preferred and practical embodiment of the invention, it will be understood by those skilled in the art that the phases of the invention may be carried out with other specific constructions and arrangement of parts, all of which are within the purview of the invention.

What I claim is:

1. Fishing rod holder comprising a component attachable to a boat and a complementary component attachable to a rod, said boat attachable component including a clamp, and a female coupling member pivoted on said clamp to swing in a vertical plane, said female coupling member being formed with a cylindrical socket axially radial with respect to the axis of swing of said female coupling member, said rod attachable component including a cradle forming a seat for the rod, and a cylindrical male coupling member attached to the under side of said cradle slidably and rotatably fitting the socket in said female coupling member, means for unitarily connecting said rod, cradle and male coupling member whereby said coupling members may be separated by the act of lifting the rod, said cradle and said female coupling member being provided with interdigitating teeth relatively circumferentially displaceable for adjustably changing the orientation of said rod.

2. Fishing rod holder as claimed in claim 1, said means for unitarily connecting said rod, cradle and male coupling member, comprising an eye bolt having an eye for receiving said rod, entering a slot in said cradle, and having a shank passing slidably through said male coupling member and a nut on said shank in abutment with said male coupling member for drawing said eye and cradle into clamping relation to the intervening rod.

3. Fishing rod holder as claimed in claim 1, said cradle being concave in cross-section, said means comprising an eye bolt passing through a bore in said cradle and cylinder, having its eye seated in a transverse arcuate channel in said cradle, and a nut on its stem abutting the inner end of said cylinder, said eye having a hinged circumferential section displaceable to admit the fishing rod to said eye, said hinged section having a free end engageable in the bore in said cradle when said eye bolt is tightened through adjustment of said nut, whereby said hinged section is locked in closed position.

References Cited in the file of this patent

UNITED STATES PATENTS

| | | |
|---|---|---|
| 1,035,739 | Raes | Aug. 13, 1912 |
| 2,184,583 | Danko | Dec. 26, 1939 |
| 2,547,507 | Sucksdorf | Apr. 3, 1951 |